US009545657B2

(12) United States Patent
Ilinich et al.

(10) Patent No.: US 9,545,657 B2
(45) Date of Patent: Jan. 17, 2017

(54) METHOD OF HYDROFORMING AN EXTRUDED ALUMINUM TUBE WITH A FLAT NOSE CORNER RADIUS

(71) Applicant: FORD GLOBAL TECHNOLOGIES, LLC, Dearborn, MI (US)

(72) Inventors: Andrey M. Ilinich, Dearborn, MI (US); Stephen Kernosky, Livonia, MI (US); Christopher John May, Novi, MI (US); S. George Luckey, Jr., Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 127 days.

(21) Appl. No.: 14/300,378

(22) Filed: Jun. 10, 2014

(65) Prior Publication Data
US 2015/0352626 A1 Dec. 10, 2015

(51) Int. Cl.
*B21D 53/88* (2006.01)
*B21D 26/041* (2011.01)
(Continued)

(52) U.S. Cl.
CPC .......... *B21D 53/88* (2013.01); *B21D 26/041* (2013.01); *B21D 26/045* (2013.01);
(Continued)

(58) Field of Classification Search
CPC ..... B21D 15/03; B21D 26/033; B21D 26/035; B21D 26/039; B21D 26/041; B21D 26/045; B21D 26/047; B21D 26/053; B21D 53/88
See application file for complete search history.

(56) References Cited

U.S. PATENT DOCUMENTS 5,070,717 A * 12/1991 Boyd ............... B21D 19/00
29/421.1
RE33,990 E * 7/1992 Cudini ............. B21D 26/033
72/360
(Continued)

FOREIGN PATENT DOCUMENTS

DE WO 2009097886 A1 * 8/2009 ............ B62D 29/00
JP 2001009528 A * 1/2001 ............ B21D 26/02
(Continued)

OTHER PUBLICATIONS

S. Yuan, et al.; "New Developments of Hydrofoming in China"; Materials transactions, vol. 53, No. 5 (2012) pp. 787-795.
(Continued)

*Primary Examiner* — Glenn Dayoan
*Assistant Examiner* — Paul Chenevert
(74) *Attorney, Agent, or Firm* — Jason Rogers; King & Schickli, PLLC

(57) ABSTRACT

A method of hydroforming a vehicle rail from an extruded aluminum tube includes the steps of positioning the extruded aluminum tube into a hydroforming die and partially closing the hydroforming die. Next is the step of applying a liquid under a first level of pressure to the extruded aluminum tube in the hydroforming die. This is followed by engaging an inner radius of a bend in the extruded aluminum tube with the hydroforming die before completely closing the hydroforming die and increasing the level of liquid pressure in the workpiece to a second level to form and hydro-pierce a part from the extruded aluminum tube.

14 Claims, 4 Drawing Sheets

(51) Int. Cl.
*B21D 26/045* (2011.01)
*B21D 26/053* (2011.01)
*B62D 29/00* (2006.01)
*B21D 26/035* (2011.01)

(52) U.S. Cl.
CPC ......... *B21D 26/053* (2013.01); *B62D 29/008* (2013.01); *B21D 26/035* (2013.01); *Y10T 29/49623* (2015.01)

(56) References Cited

U.S. PATENT DOCUMENTS

| | | | | |
|---|---|---|---|---|
| 5,303,570 | A * | 4/1994 | Kaiser | B21C 37/283 29/421.1 |
| 5,339,667 | A * | 8/1994 | Shah | B21D 26/033 29/421.1 |
| 5,728,241 | A * | 3/1998 | Gupta | C22C 21/02 148/694 |
| 5,890,387 | A * | 4/1999 | Roper | B21D 9/15 29/421.1 |
| 6,016,603 | A * | 1/2000 | Marando | B21D 15/03 29/421.1 |
| 6,032,501 | A * | 3/2000 | Bihrer | B21D 22/025 72/58 |
| 6,065,502 | A * | 5/2000 | Horton | B21D 26/033 138/109 |
| 6,122,948 | A * | 9/2000 | Moses | B21D 26/033 29/897.2 |
| 6,237,382 | B1 * | 5/2001 | Kojima | B21D 22/025 29/421.1 |
| 6,257,035 | B1 * | 7/2001 | Marks | B21D 26/033 72/55 |
| 6,513,243 | B1 * | 2/2003 | Bignucolo | B21D 26/033 29/421.1 |
| 6,810,705 | B1 * | 11/2004 | Leppin | B21C 37/065 72/369 |
| 7,204,114 | B2 * | 4/2007 | Ni | B21D 26/033 72/370.06 |
| 7,464,572 | B2 * | 12/2008 | Miyanaga | B21D 26/033 29/421.1 |
| 8,163,113 | B2 * | 4/2012 | Mishra | C22C 21/06 148/698 |
| 8,171,769 | B2 * | 5/2012 | Barthelemy | B21D 15/03 72/370.22 |
| 8,297,096 | B2 * | 10/2012 | Mizumura | B21D 22/025 29/421.1 |
| 8,826,712 | B1 * | 9/2014 | Luckey, Jr. | B21D 26/033 29/421.1 |
| 2002/0005058 | A1 * | 1/2002 | Humphries | B21D 41/02 72/370.06 |
| 2003/0192160 | A1 * | 10/2003 | Luo | B21B 3/003 29/421.1 |
| 2006/0065031 | A1 * | 3/2006 | Marando | B21D 26/039 72/58 |
| 2009/0038428 | A1 * | 2/2009 | Abe | B21D 26/023 74/492 |
| 2010/0206035 | A1 * | 8/2010 | Bestard | B21D 26/033 72/61 |
| 2011/0062155 | A1 * | 3/2011 | Walther | B21D 26/033 220/86.2 |
| 2012/0047979 | A1 * | 3/2012 | Hertell | B21D 26/033 72/58 |
| 2012/0161474 | A1 * | 6/2012 | Gerke | B62D 65/02 296/190.03 |
| 2014/0223983 | A1 * | 8/2014 | Christianson | B21D 26/033 72/58 |
| 2015/0315666 | A1 * | 11/2015 | Harrison | B21D 35/002 148/567 |

FOREIGN PATENT DOCUMENTS

| | | | | |
|---|---|---|---|---|
| JP | EP 2351623 A1 * | 8/2011 | ........... | B21D 26/033 |
| JP | WO 2011099592 A1 * | 8/2011 | ........... | B21D 26/043 |
| SU | 1523226 A1 * | 11/1989 | ........... | B21D 26/033 |
| TR | WO 2013124198 A1 * | 8/2013 | ............. | B21B 5/015 |

OTHER PUBLICATIONS

The Aluminum Automotive Manual, Version 2002; European Aluminum Association; pp. 1-96.

* cited by examiner

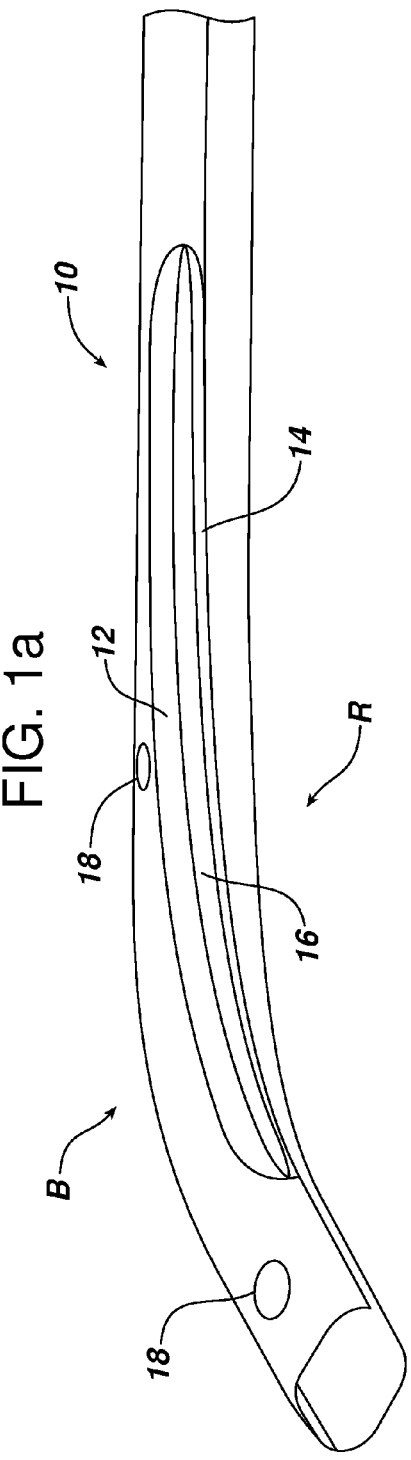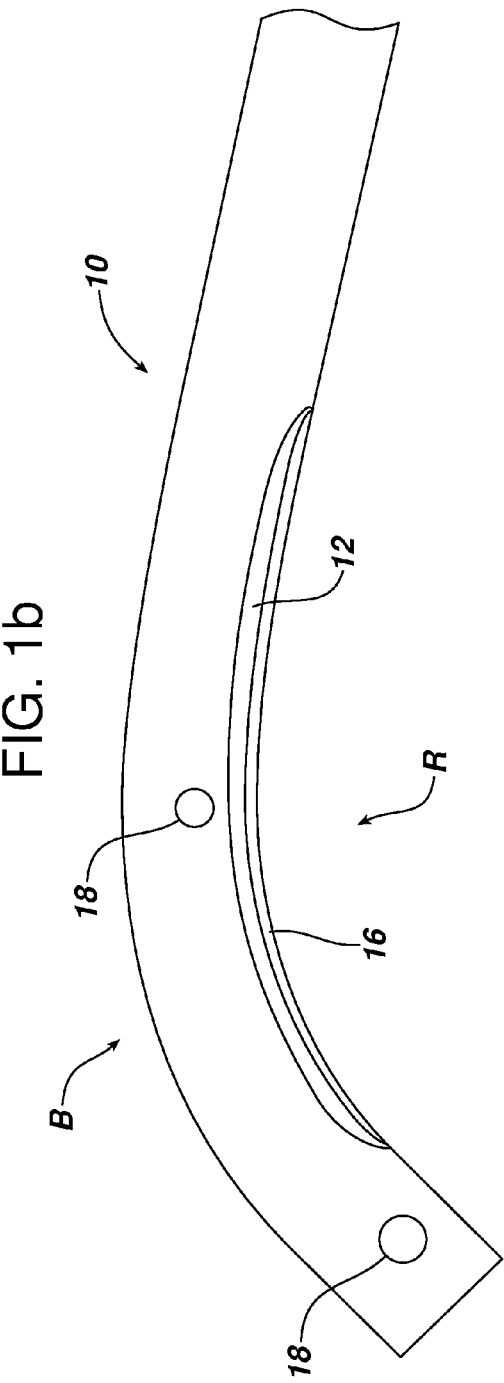

METHOD OF HYDROFORMING AN EXTRUDED ALUMINUM TUBE WITH A FLAT NOSE CORNER RADIUS

TECHNICAL FIELD

This document relates generally to hydroforming, and, more particularly, to the hydroforming of an extruded aluminum tube with a flat nose corner radius to increase formability.

BACKGROUND

Vehicle manufacturers are implementing lighter, stronger materials, such as aluminum alloys, to meet emission reduction goals, meet fuel economy goals, reduce manufacturing costs, and reduce vehicle weight. At the same time increasingly demanding safety standards must be met while reducing vehicle weight. One approach to meet these competing interests and objectives is to hydroform high strength aluminum alloy tubular blanks into strong, lightweight parts such as roof rails and front rails of motor vehicles.

Aluminum tube types include seam-welded tube, extruded seamless tube, and extruded structural tube. Seam-welded tube and extruded seamless tube are expensive. Extruded structural tubes are lower in cost because they are formed in a continuous mill operation having a greater line and material utilization efficiency than extruded seamless tubes and seam-welded tubes.

Extruded structural tubes are formed by extruding an aluminum billet through an extrusion die at a high temperature and at high pressure. Discontinuous material flow across the section of the shape occurs when the flowing aluminum separates in the mandrel plate and re-converges in the cap section. A weld line, or joining line, is created where the flowing aluminum re-converges to form the extruded shape. Extruded structural tubes may have two or more weld lines that are an artifact of the porthole extrusion process.

Significantly, aluminum seam-welded, seamless tubes and structural extrusion tubes are less formable than mild steel tubes. As a result, it is not feasible to form most parts from aluminum tubes with state of the art conventional hydroforming operations. In such operations, a hydroforming fluid, such as water, is supplied to expand and shape the tube to conform to a die cavity. Substantial expansion of the tube (circumferential length of line expansion of more than 3%) is necessary to eliminate any tube buckles and produce complexly shaped parts.

In an effort to address this problem, a method of pressure sequence hydroforming is now proposed which is particularly adapted to use with aluminum materials. More specifically, this document relates to a hydroforming method that produces a part with a flat nose corner radius which functions to increase the formability ratio or R/t (tightness) of a hydroformed corner while simultaneously preventing splitting. The formability ratio or R/t is the ratio of the bend radius (R) to the workpiece/extruded aluminum tube wall thickness (t). This value defines the sharpest forming radius allowable prior to material failure. Advantageously, the resulting increase in the formability ratio allows one to effectively and efficiently use aluminum tubes, including extruded seamless and structural tubes, to produce vehicle parts such as rails by hydroforming.

SUMMARY

In accordance with the purposes and benefits described herein, a method is provided for hydroforming a vehicle rail from an extruded aluminum tube. That method comprises the steps of (a) positioning the extruded aluminum tube into a hydroforming die, (b) partially closing the hydroforming die, (c) applying a liquid under a first level of pressure to the extruded aluminum tube in the hydroforming die and (d) engaging an inner radius of a bend in the extruded aluminum tube with the hydroforming die before completely closing the hydroforming die thereby reducing the outer fiber circumferential bending strain on the inner radius of the bend. Next is completely closing the hydroforming die around the extruded aluminum tube and increasing the level of liquid pressure to a second level to form and hydro-pierce a part such as a vehicle rail, from the extruded aluminum tube. This includes forming a cross-section of non-constant radius including a first transition segment, a second transition segment and an intermediate segment between the first and second transition segments. The method also includes providing the first and second transition segments with a tighter radius of curvature than the intermediate segment so as to thereby form a flat nose corner radius.

Still further, the method includes maintaining a gap between the hydroforming die and the first and second transition segments during hydroforming. Further the method includes a cross-sectional length of line reduction limit to prevent buckling. In one embodiment the cross-sectional length of line reduction is less than 1%. In one embodiment the extruded aluminum tube is made from AA6xxx series aluminum alloy such as AA6082-T4 or AA6061-T4.

In accordance with an additional aspect, the method of hydroforming a vehicle rail from an extruded aluminum tube may also be described as comprising forming an inner radius of a bend in the extruded aluminum tube with a cross-section of non-constant radius including a first transition segment, a second transition segment and an intermediate segment between the first and second transition segments so as to effectively form a flat nose corner radius. The method also includes providing the first and second transition segments with a tighter radius of curvature than the intermediate segment. Toward this end the method includes the step of engaging the intermediate segment of the flat nose die feature with the extruded aluminum tube while maintaining a gap between the first and second transition segments of the flat nose die feature and the tube during hydroforming.

In accordance with yet another aspect, a rail is provided for a vehicle. The rail comprises a tubular body including a bend wherein an inner radius of the bend includes a cross-section of non-constant radius having a first transition segment, a second transition segment and an intermediate segment between the first and second transition segments. The first and second transition segments have a radius of curvature that is tighter than a radius of curvature of the intermediate segment thereby effectively forming a flat nose corner radius.

The intermediate segment of the rail includes tool marks from engaging a die during hydroforming while the first and second transition segments are free of tool marks as the first and second transition segments do not engage the die during hydroforming. The inner segment of the bend may include a cross-sectional length of line reduction but the amount is limited to prevent buckling. That length of line reductions is less than 1% in one possible embodiment.

In the following description, there are shown and described several preferred embodiments of the method of hydroforming and the vehicle rail formed by that method from extruded aluminum tube. As it should be realized, the method and rail are capable of other, different embodiments and its several details are capable of modification in various, obvious aspects all without departing from the method and rail as set forth and described in the following claims. Accordingly, the drawings and descriptions should be regarded as illustrative in nature and not as restrictive.

BRIEF DESCRIPTION OF THE DRAWING

The accompanying drawing incorporated herein and forming a part of the specification, illustrates several aspects of the method of hydroforming a vehicle rail and together with the description serve to explain certain principles thereof. In the drawing:

FIG. 1a is a perspective view of a vehicle rail formed by the current method.

FIG. 1b is a top plan view of the rail illustrated in FIG. 1a.

Reference will now be made in detail to the present preferred embodiment of the method, examples of which are illustrated in the accompanying drawings.

DETAILED DESCRIPTION

Figure 3:
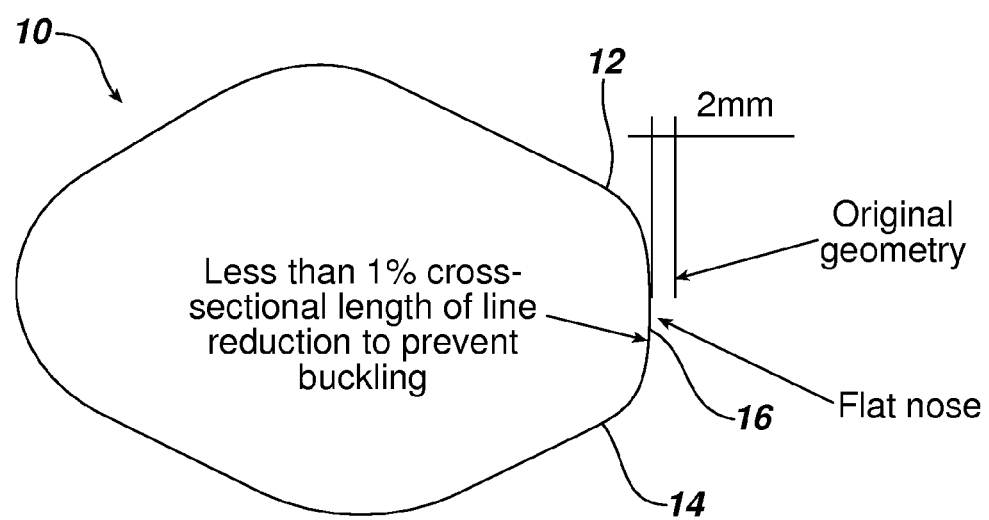
FIG. 3 is a detailed schematical illustration of the cross-sectional length of line reduction provided to the rail during the current hydroforming method in order to reduce strain in the workpiece material and prevent splitting.

Reference is now made to FIGS. 1a and 1b illustrating a vehicle rail 10 made by the method of hydroforming that is the subject of this document. The rail 10 includes a bend B. The inner radius or flat nose radius R of bend B is formed by a cross-section of non-constant radius including a first transition segment 12, a second transition segment 14 and an intermediate segment 16 between the first and second transition segments. See also FIG. 3 showing outline of rail 10 at bend B.

The process of forming the rail 10 may begin by extruding a structural aluminum alloy tube in a porthole die including a mandrel plate and a cap section. More specifically an aluminum billet is heated and extruded through the porthole extrusion die at high temperature and pressure. The extruded aluminum is separated in the mandrel plate and reconverges in the cap section. The extruded aluminum tube may be referred to as a structural extruded tube. The tube is formed in a continuous mill operation and is cut to a desired length after extruding.

Next the extruded aluminum tube may be bent in a desired manner utilizing any bending process (rotary draw, push-roll, etc.). This may be followed by an intermediate forming operation (i.e. preforming). Further the extruded tube or workpiece may be subjected to induction annealing after bending, after preforming, or after both in order to restore some formability to the extruded tube or workpiece.

After these preliminary operations and processes, the bent and preformed extruded aluminum tube or workpiece is loaded into a hydroforming die which is schematically illustrated as a two piece die D1, D2 in FIGS. 2a-2e.

Figure 2C:
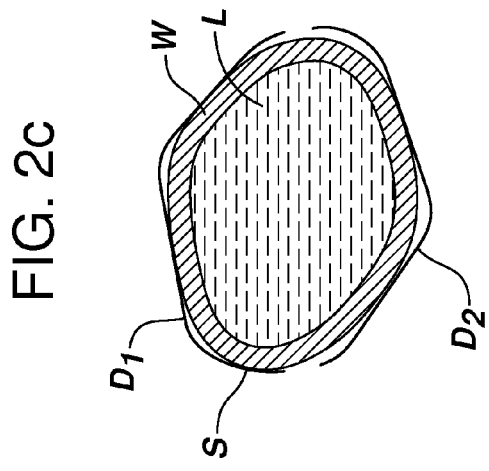
FIGS. 2a-2e are cross-sectional views illustrating the method of forming a cross section in the bend area of the vehicle rail illustrated in FIGS. 1a and 1b.
Figure 2B:
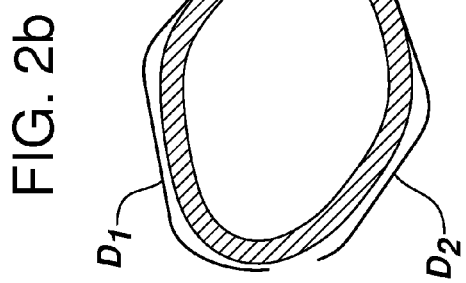
Figure 2A:
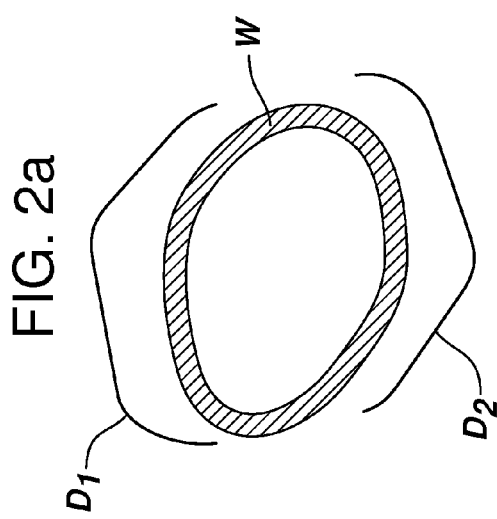
Figure 2E:
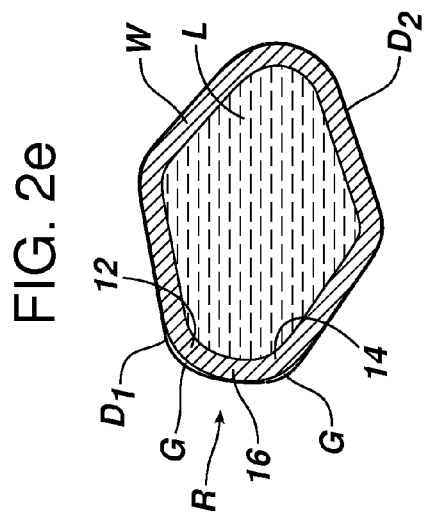

Following loading of the workpiece or tube W into the die D1, D2, the die is closed (see FIGS. 2a and 2b). Upon reaching the partially closed position illustrated in FIG. 2c, a liquid L under a first level of pressure is introduced into the interior of the workpiece W. The first level of pressure is within the range of approximately 0 to 200 bar. In another embodiment the first level of pressure is within the range of 50 to 150 bar. In yet another possible embodiment the first level of pressure is approximately 100 bar. The hydroforming liquid L may be water or other appropriate material.

As should be further appreciated from viewing FIG. 2c, the upper portion of the die D1 includes a flat nose wall section S that is specifically shaped to make contact with the workpiece W at the point in the hydroforming process when the die D1, D2 is only partially closed and the first level of pressure is being applied to prevent the tube from collapsing during the closeout stage. This point of contact forms the intermediate section 16 of the flat nose corner radius R of the rail 10. This reduces the circumferential outer fiber strain and ductility required to form the workpiece W into the part or rail 10 along the inside of the bend where the material thickens.

Figure 2D:
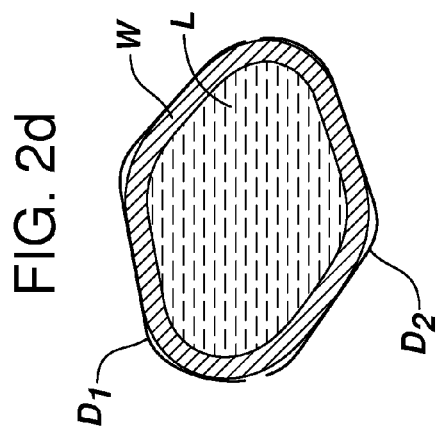

The next step in the hydroforming process is to completely close the hydroforming die D1, D2. FIG. 2d illustrates the die D1, D2 as it is being closed around the workpiece. After the die D1, D2 is fully closed around the workpiece W, the pressure of the liquid L filling the workpiece W is increased to a second level of pressure to form and hydro-pierce the workpiece W. The second level of pressure is within the range of 500 to 1500 bar. In another possible embodiment the second level of pressure is within the range of 750 to 1250 bar. In yet another possible embodiment the second level of pressure is approximately 1000 bar.

As the pressure is increased, the workpiece W is pressed outwardly toward the die D1, D2. Significantly, the intermediate section 16 of the flat nose corner radius R is already in engagement with the flat nose wall section S of the die D1 before the pressure of the liquid L is increased to the second level. This prevents unrestricted/unsupported cross-sectional bending during the closeout. In contrast, in a typical conventional scenario the workpiece does not contact the die wall until the die is fully closed and calibration pressure is applied. The actual curvature radius of the formed corner at the tip of the plastic hinge in this case is typically smaller than the corresponding radius of the die. Consequently, the resultant r/t ratio is also smaller than in the design and the outer fiber strain is higher. In the present method the flat nose wall section S engages the workpiece W early on during the closeout stage and prevents additional unrestricted bending substantially reducing the outer fiber strain and increasing r/t ratio. At the same time the strain in this area is almost unchanged during the calibration phase.

Figure 4:
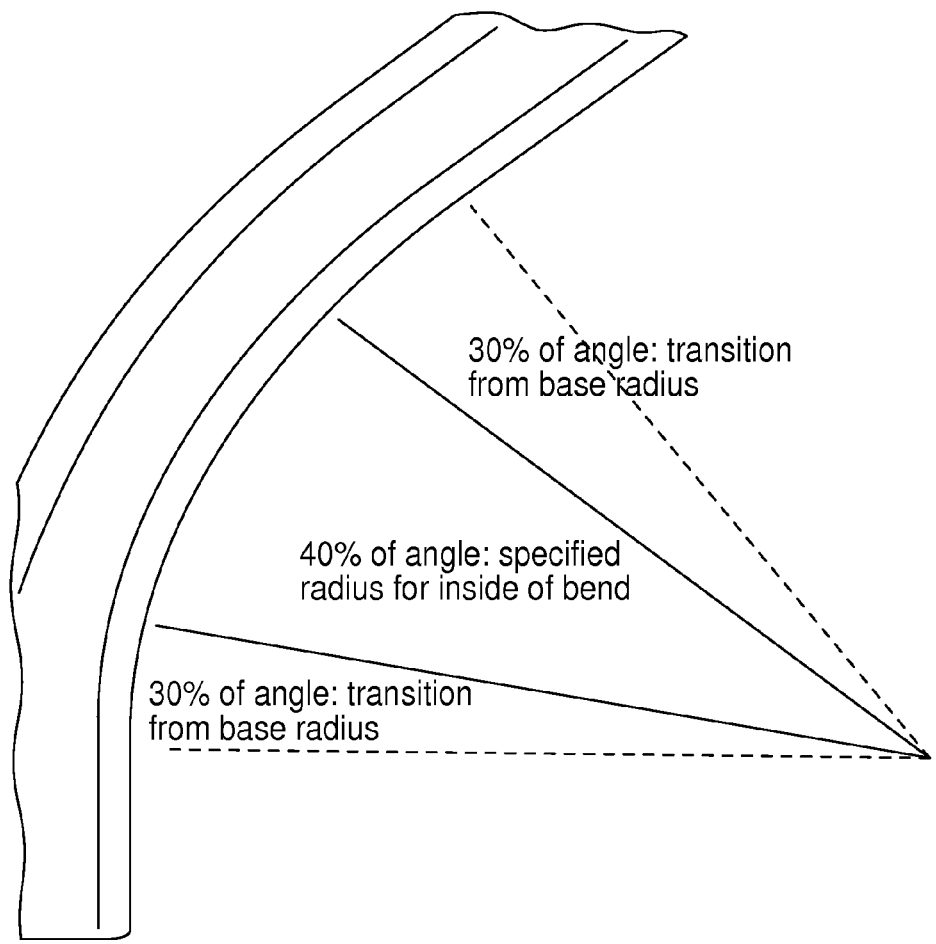
FIG. 4 is a detailed schematical illustration of the non-constant radius of the flat nose transition section.

Further, the engagement of the workpiece W with the wall section S results in a slight gap G being maintained between the die D1, D2 and the workpiece W thereby forming the first and second transition segments 12, 14 of the rail 10. Thus, it should be appreciated that the workpiece W and ultimately the rail 10 being formed in the die will have tool marks from the die D1 along the intermediate segment 16 but will be totally free of die tool marks along the first and second transition segments 12, 14. As illustrated in FIG. 4, the resulting first and second transition segments 12, 14 of the rail 10 incorporate a bend B angle where the middle 40% is extended with transition to a conventional corner shape on the remaining 30% of the angle at each end.

Following hydroforming, the workpiece W is trimmed to a final desired length by means of laser trimming or other appropriate trimming operation. Following the laser trimming operation, the workpiece, now in the form of the roof rail 10, may be heat treated to artificially age the aluminum alloy to desired strength in a manner known in the art. The rail 10 may then be subsequently subjected to chemical pretreatment to prepare it for the receipt of adhesives, paint, and/or other coating and chemicals used in a subsequent vehicle assembly operation. In an alternative embodiment, the rail 10 is subjected to chemical pretreatment before heat treatment rather than after heat treatment. Either approach may be utilized.

The following example further illustrates the method of hydroforming an extruded aluminum tube.

EXAMPLE

An extruded structural tube or seamless tube made from AA6082-T4 material has an outer diameter of 5.08 cm and a wall thickness of either 2.8 mm or 3.5 mm. The tube is positioned in the hydroforming die and the die is partially closed. The tube is then charged with a hydroforming liquid at a pressure of 100 bar to prevent tube collapsing. Continued closing of the upper die causes the tube to engage the flat nose wall section of the die which reduces the strain on the outer fiber and ductility required of the aluminum alloy in the area of the intermediate segment. The die is then fully closed and the pressure of the hydroforming liquid is increased to 1000 bar in order to complete the hydroforming process.

In summary, numerous benefits result from the pressure sequence hydroforming method disclosed in this document and schematically illustrated in FIGS. 2a-2e. As noted above, by engaging the workpiece W with the flat nose section S of the die D1 when the die D1, D2 is partially closed and the liquid is at a first, lower level of pressure it is possible to increase the minimum curvature radius formed in the tube which limits the strain on the outer fiber and prevents splitting along the intermediate segment 16. This also serves to reduce or eliminate workpiece failure and material waste resulting from the hydroforming process. After the hydroforming process is completed by fully closing the die D1, D2 and increasing the pressure of the liquid L to the second level, the inner or flat nose corner radius R of the bend B in the workpiece is provided with a cross-sectional length of line reduction of less than 1%. Significantly, that reduces the geometry of the workpiece W along the flat nose corner radius R by approximately 2 mm in width. See FIG. 3.

The foregoing has been presented for purposes of illustration and description. It is not intended to be exhaustive or to limit the embodiments to the precise form disclosed. Obvious modifications and variations are possible in light of the above teachings. For example, while not shown, a hydroformed punch may be incorporated as part of the hydroformed die D1, D2 to punch a hole 18 in the workpiece W or final part/rail 10 during the hydroforming process. A slug (not shown) is partially separated from the workpiece W when the hole is formed. All such modifications and variations are within the scope of the appended claims when interpreted in accordance with the breadth to which they are fairly, legally and equitably entitled.

What is claimed:

1. A method of hydroforming a part from an extruded aluminum tube, comprising:
    positioning said extruded aluminum tube into a hydroforming die;
    partially closing said hydroforming die;
    applying a liquid under a first level of pressure to said extruded aluminum tube in said hydroforming die to prevent collapsing of said tube;
    engaging an inner radius of a bend in said extruded aluminum tube with said hydroforming die before completely closing said hydroforming die thereby reducing the amount of the outer fiber strain on said inner radius of said bend;
    providing said inner radius of said bend with a cross-sectional length of line reduction, wherein said cross-sectional length of line reduction is less than 1%;
    forming a cross-section of non-constant radius including a first transition segment, a second transition segment and an intermediate segment between said first and second transition segments; and
    completely closing said hydroforming die around said extruded aluminum tube and increasing the first level of liquid pressure to a second level to further form and hydro-pierce said part from said extruded aluminum tube.

2. The method of claim 1, wherein said first level of pressure is between 50 and 150 bar and said second level of pressure is between 750 and 1250 bar.

3. The method of claim 1, including providing said first and second transition segments of said part with a tighter radius of curvature than said intermediate segment of said part.

4. The method of claim 1, including maintaining a gap between said hydroforming die and said first and second transition segments of said part during hydroforming.

5. The method of claim 1, wherein said extruded aluminum tube is made from AA6xxx series aluminum alloy.

6. A rail for a vehicle, comprising:
    a tubular body including a bend wherein an inner radius of said bend includes a cross-section of non-constant radius having a first transition segment, a second transition segment and an intermediate segment between said first and second transition segments, wherein said inner radius of said bend includes a cross-sectional length of line reduction and wherein said length of line reduction is less than 1%.

7. The rail of claim 6, wherein said first and second transition segments have a radius of curvature that is tighter than a radius of curvature of said intermediate segment.

8. The rail of claim 6, wherein said intermediate segment includes tool marks from engaging a die during hydroforming while said first and second transition segments are free of tool marks as said first and second transition segments do not engage said die during hydroforming.

9. A method of hydroforming a part from an extruded aluminum tube, comprising:
    forming an inner radius of a bend in said part formed from said extruded aluminum tube with a cross-section of non-constant radius including a first transition segment, a second transition segment and an intermediate segment between said first and second transition segments, wherein the cross-section of non-constant radius has a less than 1% expansion of the tube.

10. The method of claim 9, including providing said first and second transition segments of said part with a tighter radius of curvature than said intermediate segment of said part.

11. The method of claim 10, including engaging said extruded aluminum tube with a flat nose wall section of said hydroforming die so as to form said intermediate segment of said part.

12. The method of claim 11, including maintaining a gap between said hydroforming die and said first and second transition segments of said part formed from said tube during hydroforming.

13. The method of claim 12, including providing said inner radius of said bend in said part with a cross-sectional length of line reduction.

14. The method of claim 13, wherein said length of line reduction is less than 1%.

* * * * *